United States Patent [19]
Chatterjee

[11] 3,731,686
[45] May 8, 1973

[54] FLUID ABSORPTION AND RETENTION PRODUCTS AND METHODS OF MAKING THE SAME

[75] Inventor: Prondy Kumar Chatterjee, Spotswood, N.J.

[73] Assignee: Personal Products Company, Milltown, N.J.

[22] Filed: Mar. 22, 1971

[21] Appl. No.: 126,743

Related U.S. Application Data

[63] Continuation-in-part of Ser. No. 03, Feb. 10, 1969.

[52] U.S. Cl. ............................. 128/285, 128/290 R
[51] Int. Cl. ........................................ A61f 13/20
[58] Field of Search ............... 128/284, 285, 287, 128/290, 296

[56] References Cited

UNITED STATES PATENTS

| | | | |
|---|---|---|---|
| 2,486,805 | 11/1949 | Syemour et al. | 128/287 |
| 2,952,259 | 9/1960 | Burgeni | 128/290 R |
| 2,952,260 | 9/1960 | Burgeni | 128/290 R |
| 3,005,456 | 10/1961 | Graham, Jr. | 128/290 R X |
| 3,525,735 | 8/1970 | Miller | 128/296 X |
| 3,589,364 | 6/1971 | Dean et al. | 128/296 X |

*Primary Examiner*—Charles F. Rosenbaum
*Attorney*—W. Frederick Mayer, Jr., Alexander T. Kardos and Robert L. Minier

[57] ABSTRACT

Improved fluid absorption and retention products comprising fibrous carboxyalkyl cellulose having average degrees of substitution greater than 0.35, said fibrous carboxyalkyl cellulose having been heat-treated to render it water-insoluble and in compressed form to increase its fluid absorption and retention properties.

9 Claims, 5 Drawing Figures

PATENTED MAY 8 1973

INVENTOR
PRONOY K. CHATTEJEE
BY
ATTORNEY

FLUID ABSORPTION AND RETENTION PRODUCTS AND METHODS OF MAKING THE SAME

This application is a continuation-in-part of my copending U.S. application Ser. No. 797,791, filed Feb. 10, 1969 and now abandoned.

The present invention relates to absorbent products and more particularly to absorbent dressings and articles of manufacture having improved fluid absorption and retention properties and to methods of making the same. More specifically, the present invention relates to such articles of manufacture as catamenial tampons, sanitary napkins, dental rolls, dental points, and other intracorporeal body exudate and fluid absorption and retention materials, as well as other body fluid absorption and retention materials such as diapers, surgical dressings, hospital underpads, sponges, bandages, etc.

Cotton, rayon, wood pulp, and similar natural and synthetic cellulosic materials have long been used extensively in the preparation of absorbent dressings and similar products and they have been found satisfactory for many purposes. However, many other materials have long been studied and have been considered as possible replacements or improvements for such cellulosic materials.

Various carboxyalkyl ethers of cellulose, notably carboxymethyl cellulose, have long been considered and in some areas have been suggested for fluid absorption and retention purposes. For example, U.S. Pat. No. 3,005,456, which issued Oct. 24, 1961, discloses the use of carboxyalkyl cellulose, notably carboxymethyl cellulose and carboxyethyl cellulose, particularly for catamenial tampons. However, it is to be noted that the use of such carboxyalkyl ethers of cellulose is normally limited to those having a maximum average degree of substitution (D.S.) of about 0.35 carboxyalkyl radicals per anhydroglucose unit in the cellulose. Beyond that degree of substitution, the carboxymethyl cellulose tends to become too water-soluble in its properties which is now believed to cause the fluid absorption and retention properties to fall off to an extremely low, undersirable value.

It is believed that water-soluble carboxymethyl cellulose, having an average D.S. greater than 0.35, upon being contacted by fluid, quickly becomes surface-wetted, swells rapidly, and agglomerates or cakes into a gel-like mass. This gelling is at the outermost surface portions of the carboxymethyl cellulose and delays or perhaps completely blocks further access of fluid to the innermost portions of the carboxymethyl cellulose whereby very little additional fluid absorption is accomplished in a reasonable period of time.

It has now been discovered that if a water-soluble, carboxyalkyl ether of cellulose in fibrous form, such as carboxymethyl cellulose, is given a controlled heat treatment at selected elevated temperatures and for specified durations of time, the carboxymethyl cellulose fiber is modified, becomes water-insoluble, and in a compressed state possesses excellent fluid absorption and retention properties for all degrees of substitution without showing any tendency toward agglomeration, caking, gelling or blockage of wicking. As a result, fibrous carboxymethyl celluloses having degrees of substitution of 0.40, 0.70, 1.00, 1.30, 1.40 and higher, have been found to be extremely well suited for fluid absorption and retention purposes.

In the accompanying drawings and following specification, there are illustrated and described preferred designs and embodiments of articles of manufacture utilizing the present inventive concept. However, it is to be understood that the invention is not to be considered limited to the materials and the constructions disclosed, except as determiend by the scope of the appended claims.

With reference to the accompanying drawings:

FIG. 2 is a perspective view of a parallel line embossed fibrous pad incorporating the modified fibers of the present invention and which is useful as an insert within substantially uncompressed fibrous absorbent articles such as sanitary napkins, diapers, surgical dressings, underpads, bandages, sponges, and the like;

Although the invention will be described with special emphasis on carboxymethyl cellulose fibers as the fluid absorption and retention material in a specific product, namely, a catamenial tampon, such is done for illustrative purposes and the broader aspects of the invention are not to be construed as limited thereto but are to be considered equally applicable to other articles of manufacture mentioned herein as well as to fibers of other ethers of cellulose such as carboxyethyl cellulose, carboxymethyl hydroxyethyl, or other cellulose ethers containing the carboxyalkyl radical or, more precisely, as will be pointed out hereinafter, the sodium salts thereof.

Figure 1:
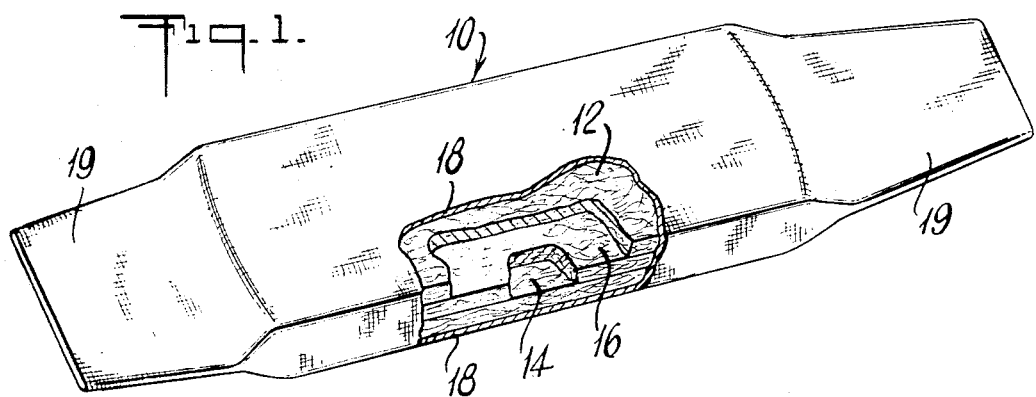
FIG. 1 is a perspective view of a sanitary napkin incorporating the present invention, partially cut away to reveal a representative inner construction.

In the embodiment of the invention shown in the drawings, and with particular reference to FIG. 1, there is shown a sanitary napkin 10 which comprises an upper fluid absorption and retention mass or pad 12 and a lower fluid absorption and retention mass or pad 14 between which is positioned a compressed fibrous pad 16. Both the upper and lower pads 12 and 14 and the compressed fibrous pad 16 are wrapped within an external textile cover 18 made of a nonwoven fabric, or of a woven fabric such as gauze, or even a knitted fabric and, as is conventional, extends beyond the ends thereof to form the usual attachment tabs 19. Such structure is exemplary of a form of sanitary napkin and is employed primarily to illustrate the incorporation of the invention in a sanitary napkin. It must be realized, however, that such is not limitative but is merely illustrative of one form of a sanitary napkin incorporating the present invention. For example, many sanitary napkins and other catamenial pads are formed without the usual attachment tabs, but are maintained in place by other means, yet such sanitary protection products are equally susceptible to improvement by the present invention.

Figure 2:
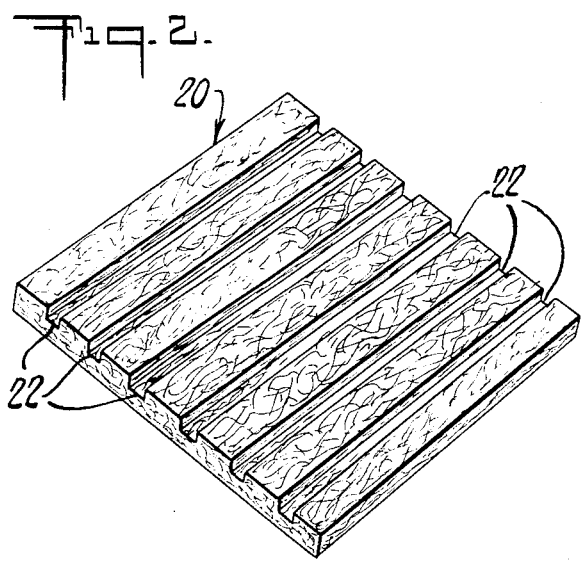

In FIG. 2, there is illustrated a fibrous pad 20 which has a plurality of parallel embossed areas 22 which provide discontinuous portions of densified fiber masses within the pad. This pad 22, can be included within the core of absorbent products, such as sanitary napkins as illustrated in FIG. 1, it forming one or more of the layers 12, 14 or 16. Similarly, the embossed pad 20 can be included within the absorbent cores of diapers, surgical dressings, hospital underpads, sponges, bandages, and the like. The parallel embossed areas 22 in the pad 20 are merely an illustrative pattern, it being understood that any embossed pattern can be imparted thereto as desired, even an over-all embossing by calendering where substantially no pattern is imparted to the surface of the pad 20.

Figure 3:
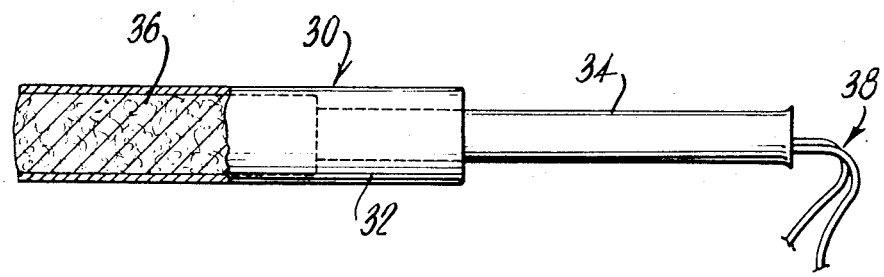
FIG. 3 is a cut-away view in elevation of a catamenial tampon containing the improved fluid absorption and retention fibers of the present invention.

In FIG. 3, there is illustrated a catamenial tampon 30 which comprises a hollow cylindrically-shaped container or applicator 32 and a smaller, cylindrically-shaped, concentrically-positioned plunger or ejector 24 which is slidably positioned within the applicator 32. A cylindrically-shaped, compressed, fluid absorption and retention fibrous mass or pad 36 is positioned within the applicator 32 and is adapted to be slidingly ejectible therefrom by movement of the plunger 34 into the applicator 32 so that the absorbent pad 36 is positioned in a body cavity to conform to the body contours of the user and to receive, absorb and retain catamenial fluids. A withdrawal cord or string 38 is secured to the base of the fluid absorption and retention mass 36 and is of sufficient length that the free end thereof extends outwardly of the body cavity for withdrawal of the tampon 36 after use. Again, such specific form of tampon is merely illustrative of one use of the present invention and is not to be construed as limitative thereof.

Figure 4:
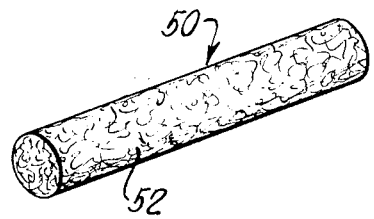
FIG. 4 is a perspective view of a dental roll containing the improved fluid absorption and retention fibers of the present invention.
Figure 5:
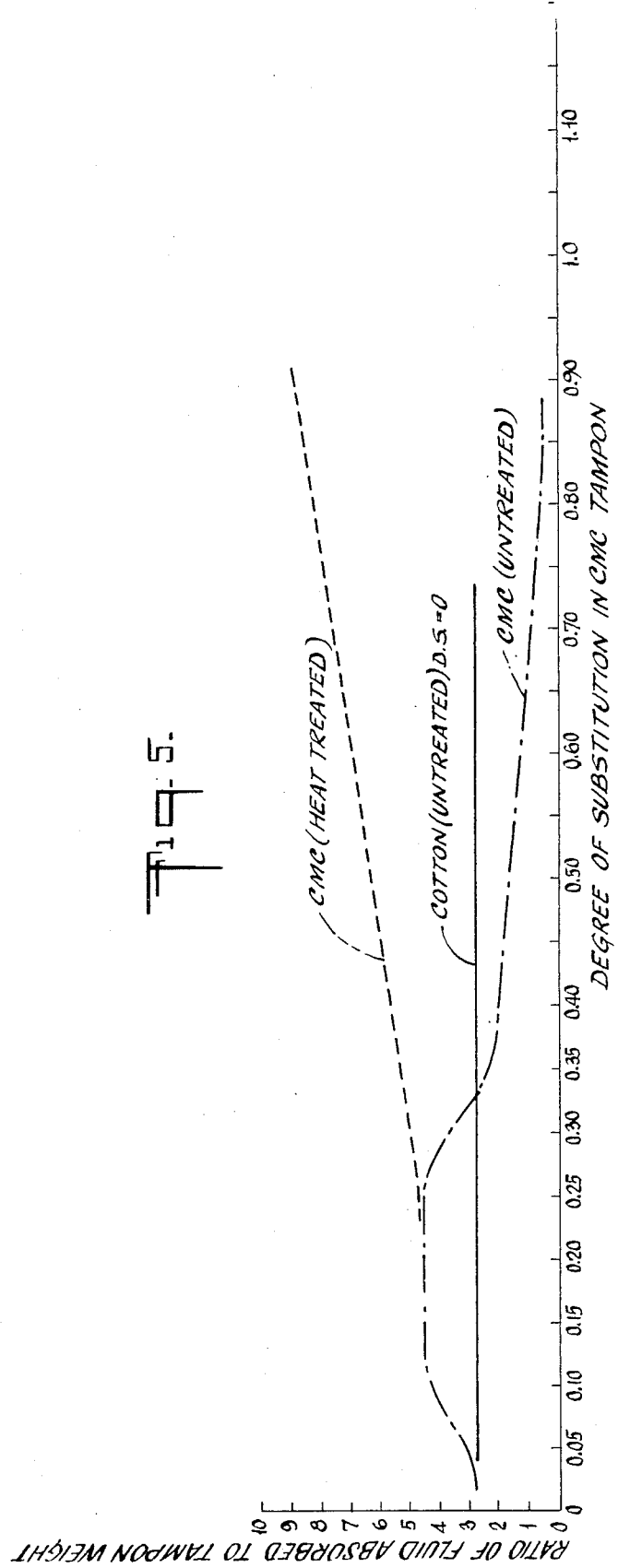
FIG. 5 is a graph showing the relationship of the degree of substitution of heat-treated carboxymethyl cellulose fibers to the ratio of fluid absorbed to tampon weight as compared to cotton and to untreated carboxymethyl cellulose fibers.

In FIG. 4, there is illustrated a dental roll 50 which comprises a cylindrically-shaped, compressed roll of fluid absorbent and retention fibers 52 of the present invention. Such rolls normally have diameters of from about five-sixteenths inch to about one-half inch and lengths of from about 1-½ inches to about 6 inches. Other uses in the dental area would be dental points, exodontia sponges, etc.

The absorbent fibers in the fluid absorption and retention bodies 16, 20, 36 and 52 comprise fibrous carboxyalkyl cellulosic materials, preferably carboxymethyl cellulose, which have been heat-treated, modified, and improved by the methods of the present invention. The carboxymethyl cellulose is in fibrous form, such as is described in U.S. Pat. No. 3,005,456.

Although carboxymethyl cellulose is generally available commercially in degrees of substitution up to only about 1.4, methods are disclosed in the scientific literature for making carboxymethyl cellulose in fibrous form from cotton linters in a multi-stage carboxymethylation with degrees of substitution up to 2.50 and 2.77. Reference is made to Carbohydrate Chemistry, Vol. III (Cellulose) (1963) pages 322–327 for a disclosure of such methods.

The above literature reference describes the use of cotton linters as the basic starting raw material for making carboxymethyl cellulose. It is to be appreciated that other basic starting raw materials, notably rayon fibers and wood pulp, can always be used.

The idealized structural formula for carboxymethyl cellulose is as follows, showing a degree of substitution of 1.0:

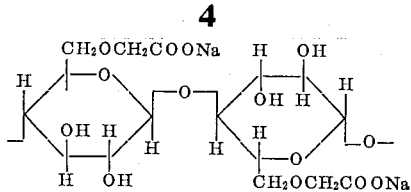

The idealized structural formula for carboxyethyl cellulose is as follows, showing a degree of substitution of 1.0:

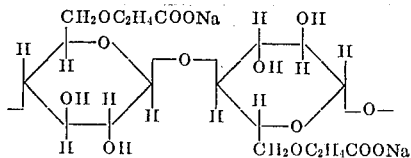

Carboxyethyl cellulose is obtained by basically the same mechanism as is used for carboxymethyl cellulose except that monochlorpropionic acid and sodium hydroxide are used rather than monochloracetic acid and sodium hydroxide.

The structural formula for carboxymethyl hydroxyethyl cellulose is as follows, showing a degree of substitution of 0.5 for carboxymethyl and 0.5 for hydroxyethyl:

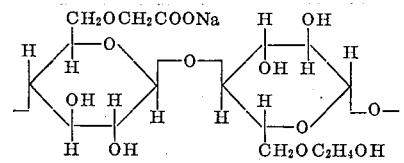

Carboxymethyl hydroxyethyl cellulose is prepared by carrying out the hydroxyethylation reaction first, and then following with the carboxymethylation reaction second.

Consideration of the above structural formulas will indicate that, although the terms "carboxymethyl cellulose," "carboxyethyl cellulose" and "carboxymethyl hydroxyethyl cellulose" are used herein, a more precise but lengthier term should include a reference to the fact that they are commercially available and are normally used as the sodium salt of such chemical compounds. Other alkali metal salts which are not as commercially available but which are equally applicable are the potassium, lithium, rubidium, and cesium salts.

The fibers of carboxymethyl cellulose are modified according to the present invention by being heated at a temperature preferably of from about 120° C. (248° F.) to about 170° C. (338° F.) for a period of from about 1 hour to about 20 hours. The reaction is exothermic. Lower temperatures down to about 110° C. (230° F.) may be used but the duration of heat treatment must then be prolonged to about 30 hours or more which is economically undesirable. In the same way, higher temperatures of about 200° C. (392° F.), or even approaching the browning temperature of about 226° C. (438° F.), may be employed for durations of heat treatments of only about 10 or 15 minutes or even less but such is a more delicate process, requiring much closer controls to avoid localized overheating or other damaging influences.

Pressure may be employed during the heat treatment whereby the temperature and time factors are decreased accordingly, as is well known in the art.

The most notable change is that the carboxymethyl cellulose fibers, subsequent to the heat treatment, become water-insoluble, and although they do swell in water several hundred per cent, they do so without developing the characteristic slippery feeling of wetted, untreated carboxymethyl cellulose. Both the untreated and heat-treated carboxymethyl cellulose fibers are soluble in 6 percent sodium hydroxide solution. The browning temperature of the heat-treated carboxymethyl cellulose fiber remains in the range of about 226°–228° C. and the charring temperature also is not materially changed from the original range of about 252°–253° C. for the untreated form. The specific gravity of the heat-treated carboxymethyl cellulose is about 1.59 grams/milliliter.

The resulting heat-treated fibers, particularly in a compressed state, when treated with water at room temperature, show tremendous amounts of water absorption and retention, along with excellent swelling, but without demonstrating the least agglomeration, gelling, caking or blockage of wicking.

When 0.8 D.S. fibrous carboxymethyl cellulose, for example, is used, the heat-treated material, when treated with water at room temperature, does not lose its fibrous characteristics, even though it swells several hundred per cent. The swelled mass of fibers do not possess the characteristic slippery or gelatinous feeling noted in untreated carboxymethyl cellulose of a similar degree of substitution, when treated with water at room temperature.

Compressed pads made from the heat-treated 0.8 D.S. carboxymethyl cellulose fibers, when dropped into water at room temperature, show extremely high absorption and wicking. Compressed pads made from 0.8 D.S. carboxymethyl cellulose which has not been heat-treated and dropped into water at room temperature do not wick any water because of gel formation on the outer portions thereof which blocks further wicking.

Although the exact mechanism of the modification of the carboxyalkyl cellulose has not been completely proved beyond doubt, it is believed that there is some degree of internal esterification taking place between the carboxylic radicals of the carboxyalkyl group and the remaining unreacted hydroxyl groups of the main cellobiose unit or anhydroglucose unit. As such, it may be generally classified as a cross-linking, internal esterification between adjacent chains of the repeating cellobiose units or anhydroglucose units.

The structural formula for a typical unit of such a cross-linked internally esterified carboxymethyl cellulose (average D.S.=1.0) is believed to be as follows, with each anhydroglucose unit illustrated being derived from separate polymer chains.

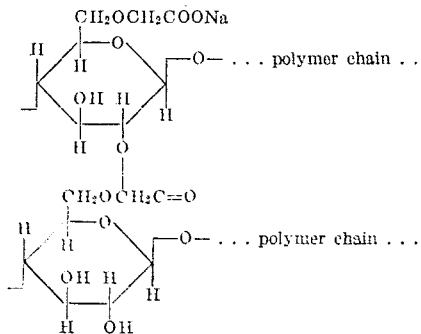

Not to be ignored, however, is the lesser possibility that there is an anhydride formation between adjacent carboxylic groups, leading to a cross-linking condensation reaction between adjacent chains. This, however, is a less likely possibility.

The invention will be described in greater detail by reference to the following examples and tables wherein specific embodiments of the invention are set forth for illustrative but not for limitative purposes.

EXAMPLES 1 - 5

Five catamenial tampons are prepared to the specifications set forth in Table I. The first two tampons are made from untreated natural cotton fibers. The third tampon is made from carboxymethyl cellulose fibers (derived from cotton fibers) and has an average degree of substitution of 0.8. The fourth and fifth tampons are made from carboxymethyl cellulose fibers (derived from cotton fibers) having an average degree of substitution of 0.8. These latter two tampons are heat-treated in an oven at 160° C. for two hours and then conditioned at room temperature.

TABLE I

|  | Untreated Cotton Control D.S.=0 | Untreated Cotton Control D.S.=0 | Untreated C.M.C. Cotton Fibers D.S.=0 | Heat-treated CMC Fibers D.S.=0.8 | Heat-treated CMC Fibers D.S.=0.8 |
|---|---|---|---|---|---|
| Weight (grains) | 32.7 | 32.7 | 32.7 | 32.7 | 32.7 |
| Length (inches) | 1.020 | 1.018 | 0.849 | 0.863 | 0.840 |
| Diameter (inches) | 0.500 | 0.500 | 0.484 | 0.483 | 0.482 |
| Volume (cubic inches) | 0.199 | 0.199 | 0.156 | 0.158 | 0.153 |
| Density (grains/cubic inch) | 164.3 | 164.3 | 209.6 | 206.9 | 213.7 |
| Cover Weight (grains) | 3.23 | 3.23 | 3.23 | 3.23 | 3.23 |

Table I sets forth the physical characteristics of the two control tampons, the untreated carboxymethyl cellulose fiber tampon, and the two heat-treated carboxymethyl cellulose fiber tampons incorporating the principles of the present inventive concept. All measurements and determinations in these and other examples in this specification are made at room temperature and at 65% relative humidity.

TABLE II

|  | Untreated Cotton Control D.S.=0 | Untreated Cotton Control D.S.=0 | Untreated C.M.C. Cotton Fibers D.S.=0.8 | Heat-treated CMC Fibers D.S.=0.8 | Heat-treated CMC Fibers D.S.=0.8 |
|---|---|---|---|---|---|

FLUID ABSORPTION MEASURED BY POTENTIAL TESTER

| Testing Pressure (inches) | 24 | 24 | 24 | 24 | 24 |
|---|---|---|---|---|---|
| Soaking Time (minutes) | 5 | 10 | 5 | 5 | 10 |
| Fluid Absorption (grains) | 85.3 | 87.1 | 20.3 | 215.8 | 279.8 |

| | | | | | |
|---|---|---|---|---|---|
| Fluid Absorption (cc.) | 5.5 | 5.6 | 1.3 | 14.0 | 18.1 |
| Potential Ratio | 2.61 | 2.66 | 0.62 | 6.59 | 8.56 |
| Potential Ratio (corrected for cover) | 2.61 | 2.66 | 0.39 | 7.05 | 9.24 |
| Absorbency Rating (cotton control) | 100 | 100 | 15 | 270 | 348 |

Consideration of Table II will reveal that the tampon of carboxymethyl cellulose fibers (0.8 D.S.) which has not been heat-treated has a corrected potential ratio of only 0.39, whereas the tampon of carboxymethyl cellulose fibers (0.8 D.S.) which has been heat-treated has a corrected potential ratio of 9.24. This represents an increase in absorption of almost twenty-four fold.

Comparison to the cotton tampon control sample reveals that the heat-treated, fibrous carboxymethyl cellulose tampon has a corrected potential ratio of 9.24 compared to only 2.66 for the cotton tampon, an increase of about 3-½ times. POtential ratio is defined in this specification as the ratio of the weight of fluid absorbed to the weight of the tampon used.

EXAMPLES 6, 7 and 8

The procedures of Examples 1 through 5 are followed substantially as set forth therein with the exception that the average degree of substitution of the carboxymethyl cellulose fibers in the tampons is approximately 0.4. The data is set forth in Tables III and IV.

TABLE III

| | Untreated Cotton Control D.S.=0 | Untreated CMC Cotton Fibers D.S.=0.4 | Heat-Treated CMC Fibers D.S.=0.4 |
|---|---|---|---|
| Weight (grains) | 32.3 | 32.5 | 32.5 |
| Length (inches) | 1.021 | 0.851 | 0.896 |
| Diameter (inches) | 0.505 | 0.482 | 0.488 |
| Volume (cubic inches) | 0.201 | 0.155 | 0.167 |
| Density (grains/cu.in.) | 158.3 | 209.7 | 194.6 |
| Cover Weight (grains) | 3.23 | 3.23 | 3.23 |

TABLE IV

| | Untreated Cotton Control D.S.=0 | Untreated CMC Cotton Fibers D.S.=0.4 | Heat-Treated CMC Fibers D.S.=0.4 |
|---|---|---|---|
| Testing Pressure (inches) | 24 | 24 | 24 |
| Soaking Time (minutes) | 5 | 5 | 5 |
| Absorption of Fluid (grains) | 89.4 | 74.7 | 195.0 |
| Absorption of Fluid (cc.) | 5.8 | 4.8 | 12.6 |
| Potential Ratio | 2.77 | 2.29 | 6.00 |
| Potential Ratio (adjusted) | 2.61 | 2.16 | 5.65 |
| Potential Ratio adjusted and corrected for cover | 2.61 | 2.11 | 5.98 |
| Absorbency Rating (cotton control) | 100 | 80.8 | 229 |

Consideration of Table IV reveals that the tampon containing the heat-treated carboxymethyl cellulose fibers (D.S.=0.4) has over 2-¼ times the absorbency of a cotton sample and almost three times the absorbency of a similar D.S.=0.4 carboxymethyl cellulose fiber tampon sample which is not heat-treated.

Reference to FIG. 4 in the drawings reveals (1) that the absorbent properties of cotton fibrous tampons have a ratio of fluid absorbed to tampon weight of about 2.61; (2) that untreated carboxymethyl cellulose fiber tampons also start with a ratio of about 2.61, climb to a maximum of about 4.5 and then rapidly fall off at an average degree of substitution of about 0.35 to very low absorbency values; and (3) that the heat-treated carboxymethyl cellulose fiber tampon of the present invention continues to climb even after a degree of substitution greater than 0.35. This graphically illustrates the advantages of the present invention.

EXAMPLES 9 and 10

Highly water-soluble, fibrous carboxymethyl cellulose having a D.S. of approximately 1.0 is heated in an oven at elevated temperatures for (1) 140° C. for two hours and (2) 150° C. for 1-½ hours. The fiber property changes in relationship to its interaction with water. The heat-treated fibrous carboxymethyl cellulose is now water-insoluble and alkali soluble (6 percent sodium hydroxide). It has excellent water absorbing characteristics (far superior to cotton, rayon, or untreated carboxymethyl cellulose fibers) and does not agglomerate, cake or gel to block the water passage into the core of the fibrous mass. It is capable of swelling several hundred per cent. Upon the application of pressure, the heat-treated carboxymethyl cellulose fibers do not flow like a gel but appear as partially swelled fibers. Carboxymethyl cellulose fibers which were not heat-treated, however, did flow like a gel upon application of pressure.

EXAMPLE 11

A semi-quantitative test is carried out to determine the relative fluid absorbency and retention characteristics and properties of (1) untreated carboxymethyl cellulose fibers (D.S. 0.8) (2) untreated cotton fibers, and (3) heat-treated carboxymethyl fibers (D. S. 0.8). The results are set forth in Table VI.

TABLE VI

ABSORPTION AND RETENTION OF FLUID (WATER) BY FIBER SYSTEMS

| Absorption on weight basis | Untreated Cottom Control D.S.=0 | Untreated CMC Cotton Fibers D.S.=0.8 | Heat-Treated CMC Fibers D.S.=0.8 |
|---|---|---|---|
| Absorption ratio at saturation | 20 | Soluble | 45 |
| Absorption ratio on compression by squeezing | 3 | no effective absorption | 18 |
| Absorption rating (cotton control) | 100 | | 225 |
| Fluid retention rating (cotton control) (after compression by squeezing) | 100 | | 600 |

Consideration of Table VI reveals that the sample containing the heat-treated carboxymethyl cellulose sample (D.S.=0.8) originally absorbs 2-¼ times the amount of fluid absorbed by the cotton control sample and then subsequently retains 6 times the amount of fluid retained by the cotton control sample. The untreated carboxymethyl cellulose fibers (D.S.=0.8) were soluble and had no effective absorption.

It is not essential that the absorbent bodies contain only heat-treated carboxyalkyl cellulosic fibers. In fact, in many cases, it is preferred that blends of the carboxyalkyl cellulose fibers and absorbent fibers of other materials be used. Such other absorbent fibers or materials may be included in percentages as low as about 10 percent by weight or as high as about 90 percent by weight, with preferred ranges from about 25 to about 75 percent by weight. Other fibers and other materials which can be included are cotton, rayon, wood pulp, comminuted tissue or other paper, etc.

If desired, other materials and other fibers, not necessarily fluid absorbent, may be added in similar percentages by weight (as noted in the preceding paragraph) to obtain special characteristics and properties. Such other materials and other fibers include, for example, untreated carboxymethyl cellulose fibers, cellulose esters such as cellulose acetate, polyamide fibers such as nylon 6, nylon 6/6, nylon 12, etc., polyester fibers such as "Dacron," "Kodel," etc., acrylic fibers such as "Dynel," "Orlon," etc. It is also contemplated that the heat-treated, modified carboxyalkyl cellulose fibers may form a portion of a more complex absorbent structure. For example, it may be used as a concentrically, centrally located, compressed core member of a catamenial tampon and be surrounded by a cylindrical sheath of other absorbent fibers or materials. Or it may be used as a centrally located compressed core of the absorbent body of a sanitary napkin or of a diaper or underpad as described earlier. Or it may be used in a multi-layered, laminated, compressed structure with other materials or fibers within such absorbent dressings and products.

Although the present invention has been described with reference to several examples and embodiments showing specific materials and specific products in specific arrangements and conformations, such is not to be considered limitative of the invention but merely illustrative thereof.

What is claimed is:

1. An absorbent dressing having improved fluid absorptive properties including a compressed body comprised of absorbent fibers of an alkali metal salt of carboxyalkyl cellulose having an average degree of substitution greater than about 0.35 carboxyalkyl radicals per anhydroglucose residue in the cellulose, said absorbent fibers of an alkali metal salt of carboxyalkyl cellulose being heat treated so as to become insoluble but swellable in water at room temperature.

2. An absorbent dressing as defined in claim 1 wherein said compressed absorbent body includes portions compressed to a density ranging from about 190 grains per cubic inch to about 215 grains per cubic inch.

3. An absorbent dressing as defined in claim 1 wherein said compressed absorbent body is comprised of a blend of said absorbent fibers of an alkali metal salt of carboxyalkyl cellulose and other natural or synthetic absorbent or non-absorbent fibers.

4. An absorbent dressing as defined in claim 3, wherein said blend is comprised of from about 10 to about 90 percent by weight of said absorbent fibers of an alkali metal salt of carboxyalkyl cellulose.

5. An absorbent dressing as defined in claim 4, wherein said blend is comprised of from about 25 to about 75 percent by weight of said absorbent fibers of an alkali metal salt of carboxyalkyl cellulose.

6. An absorbent dressing as defined in claim 1, wherein said absorbent fibers of the alkali metal salt of carboxyalkyl cellulose are sodium carboxymethyl cellulose fibers and the average degree of substitution is in the range of greater than 0.35 and up to about 1.4.

7. An absorbent dressing as defined in claim 1, wherein the absorbent dressing is a catamenial device.

8. An absorbent dressing as defined in claim 7, wherein the catamenial device is a catamenial tampon and wherein said compressed body is included within the absorbent core of said tampon.

9. An absorbent dressing as defined in claim 7, wherein the catamenial device is a sanitary napkin and wherein said compressed body is within the absorbent core of said sanitary napkin.

* * * * *